US008737727B2

(12) United States Patent
Wang et al.

(10) Patent No.: US 8,737,727 B2
(45) Date of Patent: May 27, 2014

(54) COLOR SIMILARITY SORTING FOR VIDEO FORENSICS SEARCH

(75) Inventors: Lei Wang, Clovis, CA (US); Shu Yang, Clovis, CA (US); Greg Millar, Coarsegold, CA (US); Farzin Aghdasi, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 323 days.

(21) Appl. No.: 12/982,748

(22) Filed: Dec. 30, 2010

(65) Prior Publication Data

US 2012/0170838 A1 Jul. 5, 2012

(51) Int. Cl.
*G06K 9/00* (2006.01)

(52) U.S. Cl.
USPC ........................................................ 382/165

(58) Field of Classification Search
None
See application file for complete search history.

(56) References Cited

U.S. PATENT DOCUMENTS

| 5,524,152 | A  | * | 6/1996  | Bishop et al. ................. 382/165 |
| 6,084,595 | A  |   | 7/2000  | Bach et al. |
| 6,271,861 | B1 | * | 8/2001  | Sargent et al. ................ 345/589 |
| 6,633,655 | B1 | * | 10/2003 | Hong et al. ................... 382/118 |
| 7,034,959 | B1 |   | 4/2006  | Takemoto |
| 7,139,409 | B2 | * | 11/2006 | Paragios et al. ............... 382/103 |
| 7,376,274 | B2 | * | 5/2008  | Xiong .......................... 382/218 |
| 7,386,170 | B2 |   | 6/2008  | Ronk et al. |
| 8,315,594 | B1 | * | 11/2012 | Mauser et al. ................ 455/406 |
| 2001/0026272 | A1 | * | 10/2001 | Feld et al. .................... 345/419 |
| 2002/0099524 | A1 | * | 7/2002 | Sell et al. ........................ 703/1 |
| 2002/0122570 | A1 | * | 9/2002 | Paragios et al. ............... 382/103 |
| 2002/0181767 | A1 |   | 12/2002 | Deng et al. |
| 2004/0246267 | A1 | * | 12/2004 | Oohara ......................... 345/591 |
| 2005/0047657 | A1 |   | 3/2005 | Lee |
| 2005/0143698 | A1 | * | 6/2005 | Sosalla et al. ................. 604/367 |
| 2006/0159370 | A1 | * | 7/2006 | Tanaka et al. ................. 382/305 |
| 2006/0280361 | A1 | * | 12/2006 | Umeda ......................... 382/167 |
| 2006/0280362 | A1 | * | 12/2006 | Umeda ......................... 382/167 |
| 2006/0284976 | A1 |   | 12/2006 | Girgensohn et al. |
| 2007/0024633 | A1 | * | 2/2007 | Cazier et al. .................. 345/589 |

(Continued)

FOREIGN PATENT DOCUMENTS

JP 2001-211339 A 8/2001

OTHER PUBLICATIONS

International Search Report and Written Opinion for PCT/US2011/067872 dated Jul. 24, 2012.

(Continued)

*Primary Examiner* — Bhavesh Mehta
*Assistant Examiner* — Feng Niu
(74) *Attorney, Agent, or Firm* — Hunter Clark PLLC (57) ABSTRACT

Systems and methods of sorting electronic color images of objects are provided. One method includes receiving an input representation of an object, the representation including pixels defined in a first color space, converting the input image into a second color space, determining a query feature vector including multiple parameters associated with color of the input representation, the query feature vector parameters including at least a first parameter of the first color space and at least a first parameter of the second color space and comparing the query feature vector to multiple candidate feature vectors. Each candidate feature vector includes multiple parameters associated with color of multiple stored candidate images, the candidate feature vector parameters including at least the first parameter from the first color space and at least the first parameter from the second color space. The method further includes determining at least one of the candidate images to be a possible match to the desired object based on the comparison.

20 Claims, 6 Drawing Sheets

(56) References Cited

U.S. PATENT DOCUMENTS

| | | |
|---|---|---|
| 2007/0031005 A1* | 2/2007 | Paragios et al. ............... 382/103 |
| 2007/0177026 A1* | 8/2007 | Sasaki ......................... 348/222.1 |
| 2009/0087096 A1 | 4/2009 | Eaton et al. |
| 2009/0192990 A1 | 7/2009 | Chin et al. |
| 2009/0195382 A1 | 8/2009 | Hall |
| 2009/0271819 A1* | 10/2009 | Cansler et al. .................. 725/34 |
| 2009/0295938 A1* | 12/2009 | Nikkanen .................. 348/223.1 |
| 2010/0104261 A1* | 4/2010 | Liu et al. .......................... 386/95 |
| 2010/0111370 A1 | 5/2010 | Black et al. |
| 2010/0166325 A1 | 7/2010 | Sengamedu et al. |
| 2010/0177969 A1 | 7/2010 | Huang et al. |
| 2010/0310167 A1* | 12/2010 | Umeda ......................... 382/167 |
| 2011/0044536 A1 | 2/2011 | Cobb et al. |
| 2011/0166939 A1* | 7/2011 | Junkin et al. ............... 705/14.61 |
| 2013/0215135 A1* | 8/2013 | Hirabayashi et al. ......... 345/589 |

OTHER PUBLICATIONS

W.P. Berriss, W.G. Price, and M.Z. Bober; Real-Time Visual Analysis and Search Algorithms for Intelligent Video Surveillance; IEE Int'l Visual Information Engineering Conference, VIE 2003, Jul. 7, 2003.
R. Balasubramani, Dr. V Kannan; Efficient use of MPEG-7 Color Layout and Edge Histogram Descriptors in CBIR Systems; Global Journal of Computer Science and Technology, vol. 9, No. 4 (2009).
Yanjun Wang, Ruixia Fan; Video Retrieval based on Combined Color and Texture Feature in MPEG-7; International Symposium on Photoelectronic Detection and Imaging 2007.
(Related Case) International Search Report and Written Opinion; International Patent App. No. PCT/US2011/067732; Aug. 9, 2012.
Non-Final Office Action; U.S. Appl. No. 12/982,601; Jun. 5, 2013.
Non-Final Office Action; U.S. Appl. No. 12/982,601; Dec. 5, 2012.

* cited by examiner

COLOR SIMILARITY SORTING FOR VIDEO FORENSICS SEARCH

BACKGROUND

Searching recorded video can be an extremely time consuming and labor intensive process. Video surveillance systems normally include a recorder for recording the video captured by the surveillance cameras. Initially, videocassette recorders were used for recording this data; however, the tapes could only be searched by having personnel review the tapes to find the portion of interest. The development of digital video recorders improved the searching process with the use of algorithms to search for specific items, such as when an item has disappeared from the area being viewed by the video camera. However, the ability to quickly and easily find a specific video clip of a specified object or person has not significantly improved; the process still requires personnel to review the video as with VCR tapes.

Video analytics is quickly gaining attention within the video security industry, and systems and components that use rather advanced techniques for extracting high-level information from a digital video stream are starting to be deployed. Color similarity matching is an especially difficult task for video analytics. It is difficult to find a robust way of matching colors. One problem involves the way colors are perceived by the human vision system. An investigator may want to locate a suspect wearing clothes of a specified color. For example, a task could be given to find all pedestrians wearing a dark red shirt with dark blue jeans. Currently, all investigations involve individuals (hundreds of individuals in some cases such as the London bombings of 2005) manually searching through hours of video in real-time or at best fast-forward. Researchers have tried many color models to search for perceived color. Some of the color models include color histograms, dominant colors, color layout, color structure, etc. None of these color models have proven to be accurate in identifying a specified color object or person all the time. For this reason, most video object identification methods ignore color and work with gray scale images.

SUMMARY

An example of a method of sorting electronic color images of objects in accordance with the disclosure includes receiving an input representation of a desired object, the input representation including first data representing at least one color of the desired object, the first data being in a first color space; converting the first data in the first color space into second data in a second color space different than the first color space; determining an indication of desired saturation of the at least one color; and comparing the desired saturation indication to candidate saturation indications associated with stored candidate images. If the candidate saturation indication associated with a presently compared one of the stored candidate images is not in a prescribed range of saturation indications, where the prescribed range of saturation indications includes the desired saturation indication, the method further includes discarding the presently compared candidate image as a possible match to the desired object; and determining at least one of the non-discarded candidate images to be a possible match to the desired object based on at least one of the first data or the second data.

Implementations of such a method may include one or more of the following features. Determining a query feature vector including multiple parameters associated with color of the input representation, the query feature vector parameters including at least a first parameter from the first color space and at least a first parameter from the second color space; comparing the query feature vector to multiple candidate feature vectors associated with at least a portion of the stored candidate images, each candidate feature vector including multiple parameters associated with color of a respective one of the stored candidate images, where the candidate feature vector parameters include at least the first parameter from the first color space and at least the first parameter from the second color space; and determining the at least one of the non-discarded candidate images based on the feature vector comparison. The input representation is an image representation comprising multiple pixels. Down-sampling the input representation to a block of down-sampled pixels; and determining multiple spatial frequency values of the block of down-sampled pixels in at least one of the first color space or the second color space, where the query feature vector further includes at least one of the spatial frequency values of the input representation image and each of the candidate feature vectors includes at least one spatial frequency value of the respective candidate image. The first color space is relative RGB color space, the second color space is HSV, and the spatial frequency values are in YCbCr color space. The input representation is a human generated description. If the saturation value of the desired saturation indication is greater than a threshold value, the method further includes discarding the presently compared candidate image if the candidate saturation indication of the presently compared candidate image is less than the threshold value.

An example of a system for sorting electronic color images of objects in accordance with the disclosure includes an input configured to receive an input representation of a desired object, where the input representation includes first data representing at least one color of the desired object and the first data is in a first color space. The system further includes a memory, and a processing unit communicatively coupled to the input and the memory and configured to: convert the first data in the first color space into second data in a second color space different than the first color space; determine an indication of desired saturation of the at least one color; and compare the desired saturation indication to multiple candidate saturation indications associated with multiple candidate images stored in the memory. If the candidate saturation indication associated with a presently compared one of the stored candidate images is not in a prescribed range of saturation indications, where the prescribed range of saturation indications includes the desired saturation indication, the processor is configured to discard the presently compared candidate image as a possible match to the desired object, and determine at least one of the non-discarded candidate images to be a possible match to the desired object based on at least one of the first data or the second data.

Implementations of such a system may include one or more of the following features. The first color space or the second color space is relative RGB color space. The processing unit is further configured to: determine a query feature vector including multiple parameters associated with color of the input representation, where the query feature vector parameters includes at least a first parameter from the first color space and at least a first parameter from the second color space; compare the query feature vector to multiple candidate feature vectors associated with at least a portion of the stored candidate images, each candidate feature vector including multiple parameters associated with color of a respective one of the stored candidate images, the candidate feature vector parameters including at least the first parameter from the first color space and at least the first parameter from the second color space; and determine the at least one of the non-discarded candidate images based on the feature vector comparison. The input representation is an image representation comprising multiple pixels. The processing unit is further configured to: down-sample the input representation to a block of down-sampled pixels; and determine multiple spatial frequency values of the block of down-sampled pixels in at least one of the first color space or the second color space, where the query feature vector further includes at least one of the spatial frequency values of the input representation image and each of the candidate feature vectors includes at least one spatial frequency value of the respective candidate image. The first color space is relative RGB color space, the second color space is HSV, and the spatial frequency values are in YCbCr color space. The input representation is a human generated description. If the saturation value of the desired saturation indication is greater than a threshold value, the processing unit is further configured to discard the presently compared candidate image if the candidate saturation indication of the presently compared candidate image is less than the threshold value.

An example of a non-transitory machine-readable storage medium in accordance with the disclosure includes instructions embodied thereon that, when executed by at least one machine, cause the at least one machine to: receive an input representation of a desired object, the input representation including first data representing at least one color of the desired object, the first data being in a first color space; convert the first data representing at least one color of a desired object from the first color space into second data in a second color space different than the first color space; determine an indication of desired saturation of the at least one color; and compare the desired saturation indication to multiple candidate saturation indications associated with multiple stored candidate images. If the candidate saturation indication associated with a presently compared one of the stored candidate images is not in a prescribed range of saturation indications, where the prescribed range of saturation indications includes the desired saturation indication, the instruction cause the at least one machine to: discard the presently compared candidate image as a possible match to the desired object; and determine at least one of the non-discarded candidate images to be a possible match to the desired object based on at least one of the first data or the second data.

Implementations of such a non-transitory machine-readable storage medium can include one or more of the following features. The first data is an image representation comprising multiple pixels. The instructions further include instructions that cause the at least one machine to: down-sample the pixels of the image to a block of down-sampled pixels; and determine multiple spatial frequency values of the block of down-sampled pixels in at least one of the first color space or the second color space, where the query feature vector further includes at least one of the spatial frequency values of the input representation image and each of the candidate feature vectors includes at least one spatial frequency value of the respective candidate image.

Another example of a method of sorting electronic color images of objects includes receiving an input representation of an object, the representation comprising multiple pixels, each pixel being defined by values of parameters of a first color space; converting the input image into a second color space different than the first color space; determining a query feature vector including multiple parameters associated with color of the input representation, the query feature vector parameters including at least a first parameter of the first color space and at least a first parameter of the second color space; comparing the query feature vector to multiple candidate feature vectors, each candidate feature vector including multiple parameters associated with color of a respective one of multiple stored candidate images, the candidate feature vector parameters including at least the first parameter from the first color space and at least the first parameter from the second color space; and determining at least one of the candidate images to be a possible match to the desired object based on the comparison.

Another example of a system for sorting electronic color images of objects includes an input configured to receive an input representation of a desired object, the input representation including first data representing color of the desired object, the first data being in a first color space; a memory; and a processing unit communicatively coupled to the input and the memory and configured to: convert the input data in the first color space into second data in a second color space different than the first color space; determine a query feature vector including multiple parameters associated with color of the input representation, the query feature vector parameters including at least a first parameter of the first color space and at least a first parameter of the second color space; compare the query feature vector to multiple candidate feature vectors, each candidate feature vector including multiple parameters associated with color of a respective one of multiple candidate images stored in the memory, the candidate feature vector parameters including at least the first parameter of the first color space and at least the first parameter of the second color space; and determine at least one of the candidate images to be a possible match to the desired object based on the comparison.

DETAILED DESCRIPTION

Techniques are discussed herein for searching stored video clips for desired color objects (objects, animals, people and anything else visible are referred to generally herein as "objects") are provided. The desired color objects can be in the form of a human generated description (e.g., an individual six feet tall, black hat, yellow tee-shirt and gray pants) or a sample image of the object previously captured by a camera. The color description or sample image is analyzed and a feature vector describing the color(s) of the desired object is determined. The feature vector can include color parameters from multiple color spaces. The stored video clips include candidate objects that have been previously identified through video analytics, e.g., using a scene analyzer such as described in U.S. Pat. App. Publication No. 2012/0170803, which is incorporated by reference in its entirety for all purposes. The candidate images can be associated with stored metadata such as feature vectors of the color parameters. Potentially matching images can be identified by computing a distance measurement between the feature vector of the desired object and a feature vector of each of the candidate images. The candidate images can be pre-screened based on a saturation value(s) of the desired color object. For example, if the desired object has a saturation value less than a low threshold value, then all candidate color images with a saturation value(s) greater than the low threshold level can be discarded. If the desired object has a saturation value greater than a high threshold value, then all candidate color images with a saturation value(s) less than the high threshold level can be discarded. The feature vectors can include parameters that describe the color layout (e.g., one or more AC spatial frequency parameters) of the desired and candidate objects.

Different color spaces include different parameters used to represent colors. Different parameters of different color spaces are perceptible to the human vision system at different levels of sensitivity. Digital video is typically represented in the RGB (red, green blue) color space. Digital cameras typically capture images in a color space known as YUV, where Y is luma (or luminance in analog systems), and U and V are blue-luminance and red-luminance differences, respectively. The YUV color space encodes a color image or video taking human perception into account, allowing reduced bandwidth for chrominance components, thereby typically enabling transmission errors or compression artifacts to be more efficiently masked by the human perception than using a "direct" RGB-representation. Colors in the YUV color space are converted to the RGB color space with the following relationship (other relationships can be used, depending on how the YUV parameters are defined):

$$\begin{bmatrix} r \\ g \\ b \end{bmatrix} = \begin{bmatrix} 1.0 & 0 & 1.13983 \\ 1.0 & -0.39465 & -0.58060 \\ 1.0 & 2.03211 & 0 \end{bmatrix} \begin{bmatrix} Y \\ U \\ V \end{bmatrix} \quad (1)$$

The RGB color space does not take human perception into account and the three primary colors provide a more even representation (not weighted towards human perception into account) of colors for each of the parameters r, g and b. The YCbCr color space is another color space that takes human perception into account. In the YCbCr color space, Y is the luma component and Cb and Cr are the blue-difference and red-difference chroma components. Another color space is the HSV color space, where H is hue, S is saturation, and V is value (a measure similar to intensity). In some systems, the saturation of the HSV color space can be used as a filter to filter out color objects that are in a different saturation region than the desired object. The remaining objects are then searched based on parameters from multiple color spaces such as, for example, the ROB and the HSV color spaces, or the RGB, the HSV and the YCbCr color spaces. In this way, the search for color objects is based on a fusion of colors from different color spaces.

Figure 1:
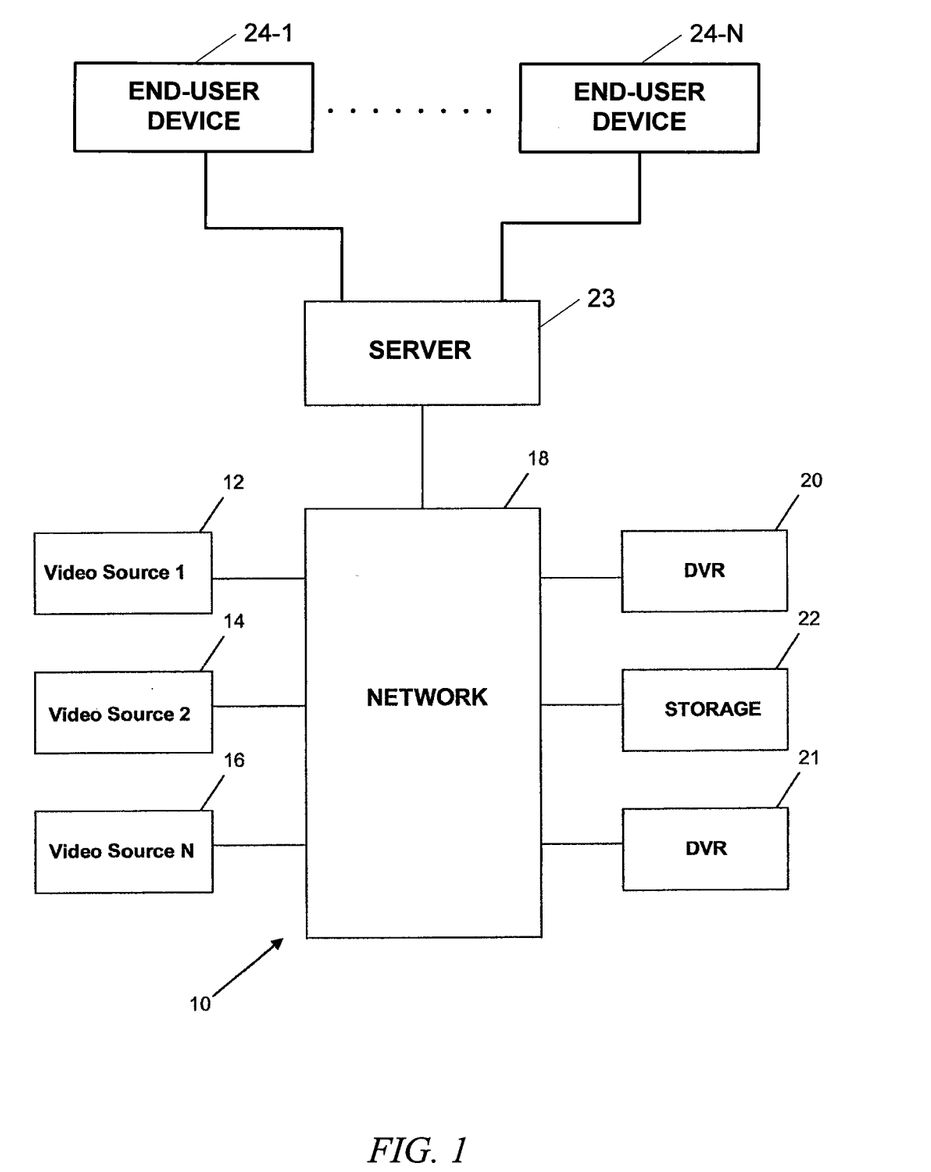
FIG. 1 is a block diagram of a video surveillance system in which various aspects of searching recorded video can be implemented in accordance with the disclosure.

Referring to FIG. 1, video surveillance system 10 is shown in block diagram form. Video surveillance system 10 includes a plurality of video sources from 1 through N, which are labeled 12, 14, and 16, connected to network 18. Video sources 12, 14, and 16 can include, for example, still or full motion video cameras. Moreover, video sources 12, 14, and 16 can produce raw digital or analog video data. If video sources 12, 14, and 16 produce analog video data, a digitizer can be used to digitize the video data. Video sources 12, 14, and 16 can capture and provide color or monochromatic video data.

Network 18 can be a closed network, local area network or wide area network, such as the Internet. A plurality of digital video recorders (DVR) 20 and 21 are also connected to network 18 for recording the video from video sources 12, 14, and 16. In some embodiments, one or more DVRs 20 or 21 can be a network video recorder, or can be connected directly to a display or workstation. The DVRs 20 or 21 can include any type of video storage device including a hard drive and/or a flash drive. As used herein, recorded video includes full-motion video and still images taken at intervals. Storage 22 can be connected to network 18 to provide additional storage for recorded video which, for example, can be transferred from digital video recorder 20 for short-term or long-term storage. Storage 22 can be connected to network 18 as shown or directly to digital video recorder 20 or 21, such as an expansion box. Server 23 is connected to network 18 to provide multiple end-user devices 24-1 to 24-N with video searching capabilities. Server 23 can be a general purpose computer with software for implementing software searching methods for searching recorded video data and for providing a graphical user interface for searching recorded video data. User devices 24 can be general purpose computers that include a display and one or more user input devices for accessing video surveillance system 10 and utilizing the video data search methods provided by the server 23. The graphical user interface software for searching the recorded video data and the video searching software can reside anywhere in the system such as, for example, end-user devices 24, server 23, DVRs 20 and 21, or storage 22. Various other combinations of video sources, video recorders, networks, and/or workstations can be utilized.

Figure 2:
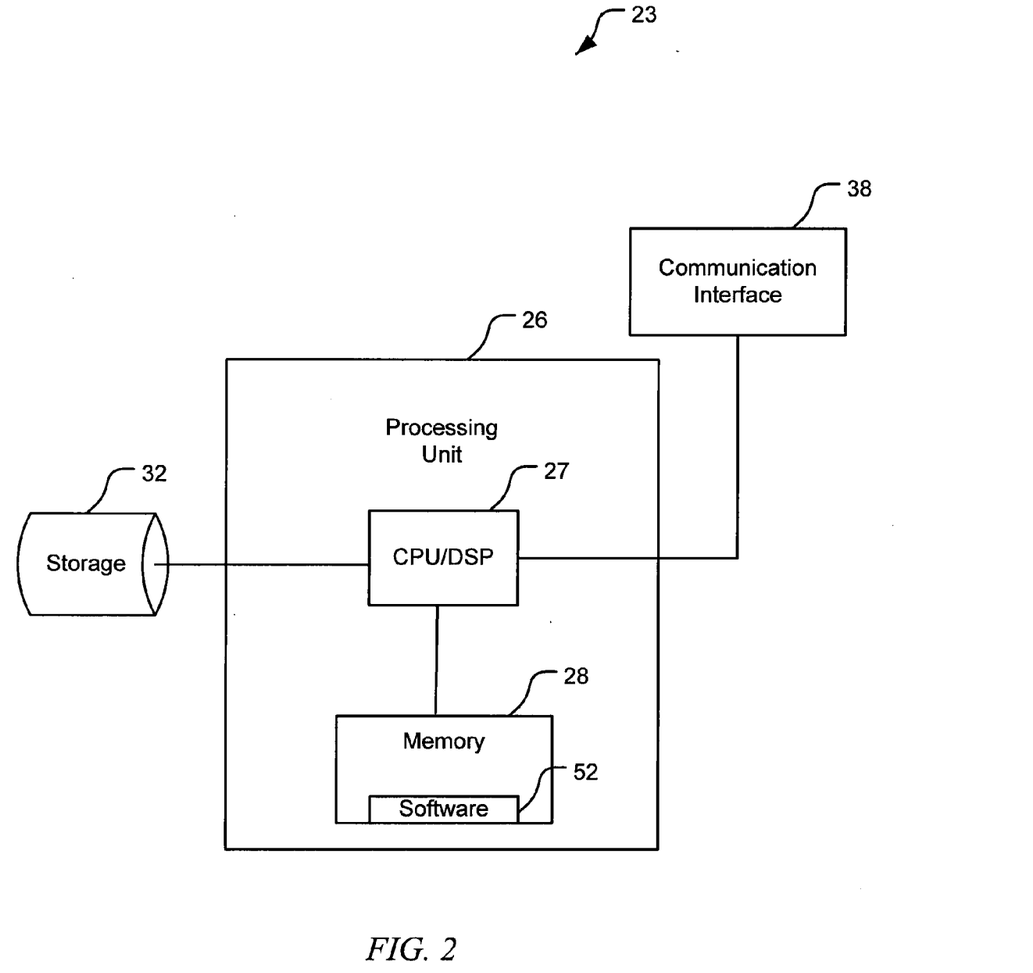
FIG. 2 is a block diagram of the server of FIG. 1.

Referring to FIG. 2, the server 23 includes a processing unit 26, storage 32 and a communication interface 38. The processing unit 26 is coupled with the communication interface 38 through which information is sent to and received from the end-user devices 24, e.g., through a communication network such as a local area network, a wide area network, a wireless network, etc. The storage 32 can be external storage such as tapes, disks, or removable cartridges such as, for example, cartridges including a tape drive, a hard-drive or a solid state memory such as flash.

The processing unit 26 processes image information and includes a central processing unit (CPU) or digital-signal processor (DSP) 27 and memory 28. The CPU/DSP 27 is preferably an intelligent device, e.g., a personal computer central processing unit (CPU) such as those made by Intel® Corporation or AMD®, a microcontroller, an application specific integrated circuit (ASIC), etc. DSPs, such as the DM6446 made by Texas Instruments®, can also be used. The CPU/DSP 27 is coupled to the memory 28 that includes random access memory (RAM) and read-only memory (ROM). The memory 28 and the storage 32 is non-transitory and preferably stores machine-readable, machine-executable software code 52 containing instructions that are configured to, when executed, cause the CPU/DSP 27 to perform various functions described herein. Alternatively, the software 52 may not be directly executable by the processor CPU/DSP 27 but is configured to cause the processor CPU/DSP 27, e.g., when compiled and executed, to perform functions described herein.

Figure 3A:
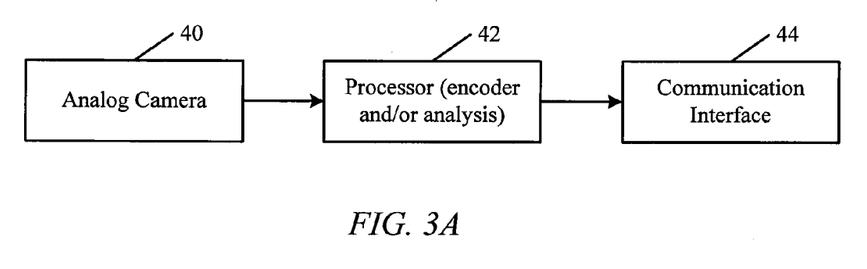
FIG. 3A is a block diagram of the video sources of FIG. 1.
Figure 3B:
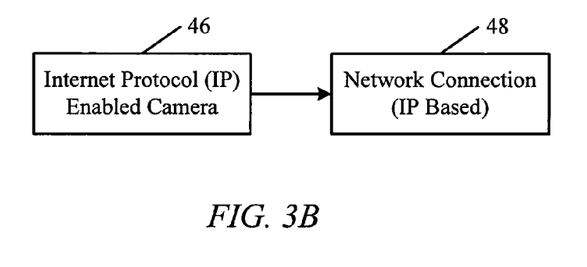
FIG. 3B is a block diagram of another of the video sources of FIG. 1.
Figure 3C:
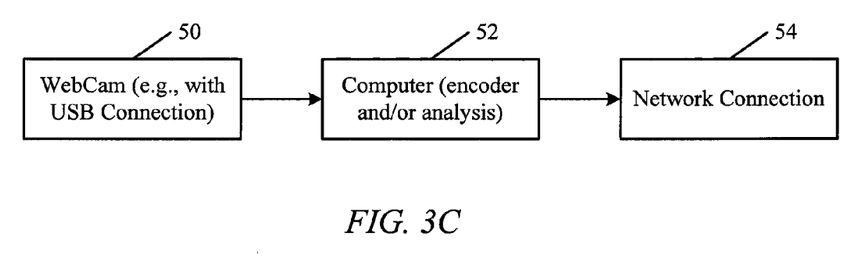
FIG. 3C is a block diagram of yet another of the video sources of FIG. 1.

Examples of functional block diagrams of video sources are illustrated in FIGS. 3A, 3B and 3C. Any of the video sources illustrated in FIGS. 3A, 3B and 3C can be used for any of the video sources 12, 14, or 16 in FIG. 1. The video source in FIG. 3A includes an analog camera 40 that provides analog video data to a processor 42 that includes memory. The analog camera 40 provides a video signal such as, for example, an NTSC (National Television System Committee) video signal to the processor 42. The processor 42 includes an encoder configured to covert the analog video received from the camera 40 into a compressed digital video format. The processor 42 can also include analysis software to perform one or more of the video processing methods described below. The processor 42 communicates the digital video signal to one or more of the DVRs 20 and 21, the storage 22 or the server 23 via a communication interface 44.

Referring to FIG. 3B, a video source includes an Internet Protocol or IP camera 46. The IP camera 46 is a digital camera that can capture images at a standard rate of 30 frames/sec in the YUV color space (or another color space at another frame rate). The IP camera 46 communicates the digital video to one or more of the DVRs 20 and 21, the storage 22 or the server 23 via an IP network connection 48 and the network 18. The IP camera 46 can include a light sensitive CCD or CMOS sensor.

Referring to FIG. 3C, a video source includes a Webcam 50 that includes, for example, a USB (Universal Serial Bus) connection with a computer 52. The images can be captured by the Webcam at a standard rate of 30 frames/sec in the YUV color space (or another color space). Computer 52 can compress the raw video data into a digital video format, for example MPEG. The compressed video data can be streamed, for example, to network connection 54 for transmitting to network 18 and to one or more of the DVRs 20 and 21, the storage 22 or the server 23. While the various video sources of FIGS. 3A, 3B and 3C have been shown to include separate devices, their functions can be provided in a single device or in two devices rather than two or three separate devices as illustrated.

A scene analyzer algorithm can be implemented in processor 42, IP camera 46, computer 52, server 23 and/or the end-user devices 24 to detect an aspect or occurrence in the scene in the field of view of any of the video sources 12, 14 and 16; such as, for example, to detect and track an object in the monitored scene. If the scene analysis is performed in the processor 42, the IP camera 46 or the computer 52, the information about events and objects can be sent as metadata with the video data to network 18. This video data can include, for example, the detection of a person crossing a trip wire or the detection of a red vehicle. Alternatively, the video could be streamed over network 18 and then analyzed by, for example, DVR 20 or 21 or the server 23 before the streamed video is stored.

Figure 4:
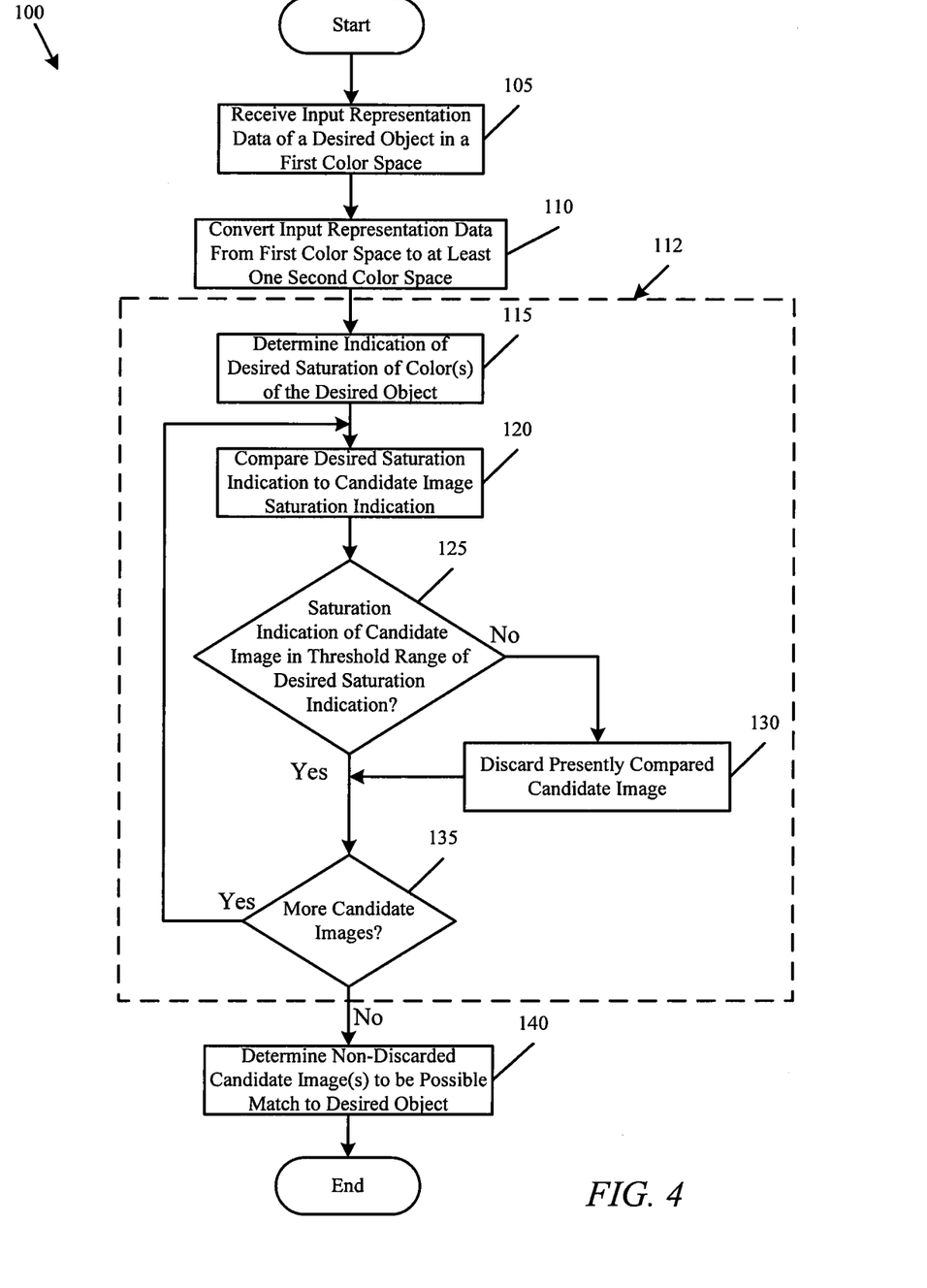
FIG. 4 is a process for sorting electronic color images of objects according to some embodiments.

Referring to FIG. 4, with further reference to FIGS. 1-3, a process 100 of sorting electronic color images of objects to match a desired object includes the stages shown. The process 100 is, however, an example only and not limiting. The process 100 can be altered, e.g., by having stages added, removed, rearranged, combined, and/or performed concurrently. For example, stage 140 described below of determining candidate images to be possible matches to a desired object can be performed before saturation filtering stage 112 including sub-stages 115, 120, 125, 130 and 135.

The process 100 starts at stage 105 where the processing unit 26 receives an input representation of a desired object. The input representation includes first data representing at least one color of the desired object where the first data is in a first color space. The input representation data can be represented in different color spaces including, for example, the YUV color space or the RGB color space. The input representation data can be input in other color spaces. The system described herein uses an input representation encoded in the RGB color space. If the input representation data is in the YUV color space, relationship (1) above is used to transform the input representation data to the RGB color spaces. Other transformations can be used if the input representation data is in another color space. The RGB input representation data is converted to a relative RGB components using the following relationships:

$$R = \frac{r}{r+g+b}, \quad (2)$$
$$G = \frac{g}{r+g+b},$$
$$B = \frac{b}{r+g+b}.$$

Where r, g and b are the original input representation data in the RGB color space. The conversion to the relative RGB components (R, G, B) is a form of normalization used in some systems to emphasize the relative values of the primary colors rather than the absolute values.

The input representation data can be input using a user interface of the end-user devices 24. The input representation can be in the form of a description generated by a user (e.g., a witness to a crime or other event). The user interface can provide one or more lists of object types (e.g., a car, a truck, a person, etc.) for the user to choose from. The type of object can be used to narrow the scope of the search to stored images that have been previously classified in the object type chosen by the user. The user interface can also enable the user to choose other object characteristics such as, for example, color, speed, aspect ratio, direction, object size, etc. If a user does not specify a value for an input parameter, any value of that parameter is acceptable.

The user interface can provide a color palette to allow the user to choose one or more colors for the input representation data. The color palette can be a circle in the cylindrical HSL (Hue, Saturation, Lightness) or HSV (Hue, Saturation, Value) color spaces for a selected value of lightness or value (both lightness and value are referred to generally as intensity). Alternatively, a pull-down menu of textual color descriptions can be provided by the user interface for color selection. Regardless of how the one or more colors of the description are chosen, the chosen color provides values for each parameter in the input color space.

The color of the user generated description can be a single color, or multiple colors. Multiple colors could be chosen for different regions of the object, depending on the object type. For example, when the object type is a person, the user could choose shirt color, pants color, hair color, etc.

In some systems, after the description is entered by the user, the processing unit 26 determines a feature vector including color parameters that represent various color characteristics of the user-described object. Details of feature vectors that are used in the search are described below. The feature vector is a form of metadata that is used to search through similar metadata of stored candidate images to identify possible matching objects.

Alternatively to the user inputting a description of the desired object, the input representation data can be in the form of a captured image of the desired object. For example, a digitized image originating from the analog camera 40, the IP camera 46 or the Webcam 50, of one of the video sources 12, 14 or 16, can be used as the input representation data. When a captured image is used as the input representation data, the processing unit 26 calculates a feature vector based on the pixel values of the input image pixels.

The input representation data received at stage 105 and/or the feature vector are encoded in, or converted to, the RGB color space. In order to perform a search that fuses parameters from multiple color spaces the process 100 continues at stage 110 where the processing unit 26 converts the input representation data and/or the determined feature vector data from the RGB color space into at least one second color space different than the RGB color space. The following relationship is used by the processing unit 26 to convert from the RGB color space to the YCbCr color space:

$$\begin{bmatrix} Y \\ C_b \\ C_r \end{bmatrix} = \begin{bmatrix} 65.481 & 128.553 & 24.966 \\ -37.797 & -74.203 & 112.0 \\ 112.0 & -93.786 & -18.214 \end{bmatrix} \begin{bmatrix} r \\ g \\ b \end{bmatrix} + \begin{bmatrix} 16 \\ 128 \\ 128 \end{bmatrix} \quad (3)$$

In the process 100, the at least one second color space of stage 110 includes a color space with a saturation parameter. For example, the second color space in the process 100 can be the HSV color space or the HSL color space. The process 100 utilizes the HSV color space. The processing unit 26 uses the following relationships to convert the input representation data from the RGB color space to the HSV color space:

$$M = \max(r, g, b) \quad (4A)$$
$$m = \min(r, g, b)$$
$$C = M - m$$

$$H' = \begin{cases} \text{undefined}, & \text{if } C = 0 \\ \dfrac{g-b}{C} \bmod 6, & \text{if } M = r \\ \dfrac{b-r}{C} + 2, & \text{if } M = g \\ \dfrac{r-g}{C} + 4, & \text{if } M = b \end{cases} \quad (4B)$$

$$H = 60° \times H' \quad (4C)$$

$$V = M \quad (4D)$$

$$S = \begin{cases} 0, & \text{if } C = 0 \\ \dfrac{C}{V}, & \text{Otherwise} \end{cases} \quad (4E)$$

Upon converting the input representation data and/or the feature vector data into the second color space(s), the process 100 continues to a saturation filter stage 112 that includes sub-stages 115, 120, 125, 130 and 135. Experimentation has shown that color saturation plays a critical role in the human vision system. By using the HSV color space, the saturation value of a color is readily obtained from the saturation component S. It has been found that candidate images with saturation values close to the saturation value of the input representation data have a better chance of successfully matching the desired object.

At sub-stage 115, the processing unit 26 determines an indication of the saturation of the desired object described by the input representation data that was input at stage 105. In systems where one of the second color spaces includes a saturation parameter (e.g., the HSV or HSL color spaces), the average saturation value of the input representation data can be used as the saturation indication.

Figure 5:
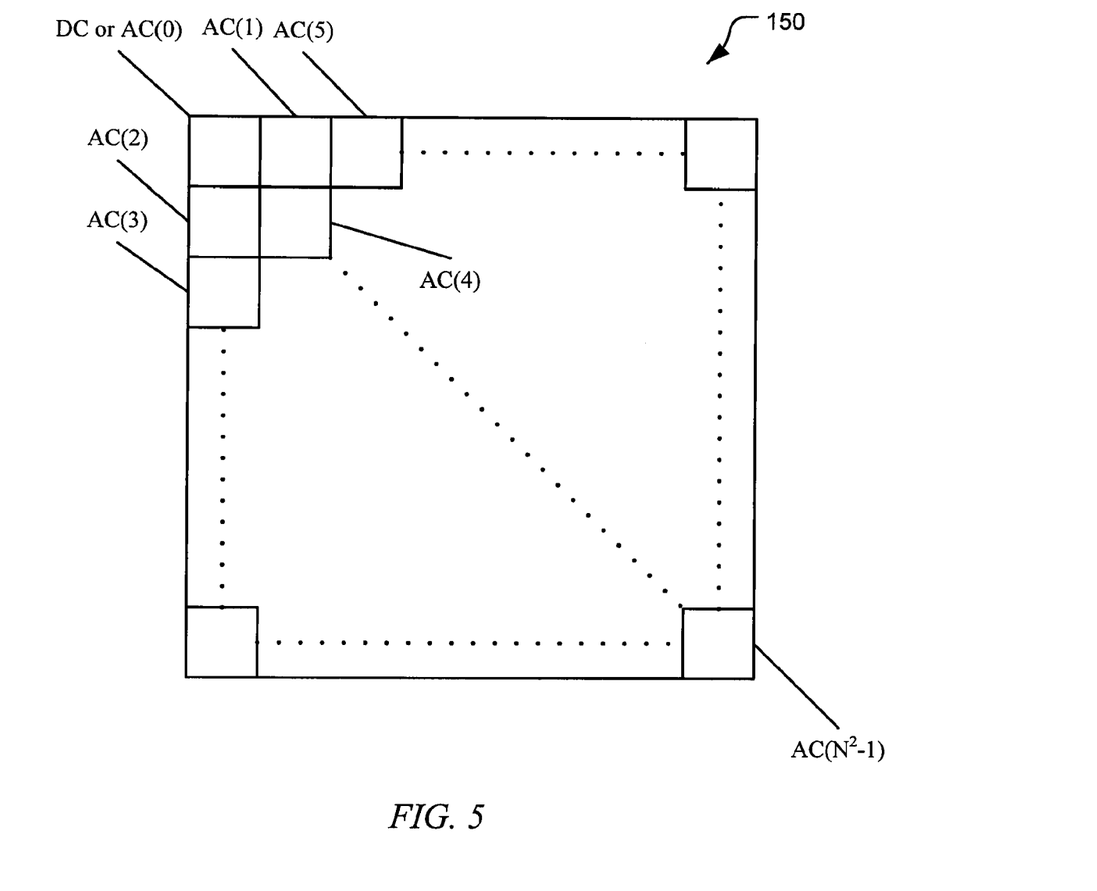
FIG. 5 is an output matrix of a Discrete Cosine Transform (DCT).

The average saturation value of the desired object can be determined by calculating a Discrete Cosine Transform (DCT) of a down-sampled block of pixels of an input image, where the DC value of the DCT is used as the indication of the saturation. Referring to FIG. 5, a DCT matrix 150 resulting from the DCT calculation is shown. The DCT matrix 150 illustrates the positions of the different spatial frequency coefficients of the DCT including a DC parameter (also referred to as the AC(0) parameter or the average), and $N^2-1$ AC parameters, where N is the dimension of the down-sampled pixel block. For example, an eight-by-eight (N=8) pixel block would have one DC coefficient and sixty-three AC coefficients. The AC coefficients are positioned in what is referred to as a zig-zag pattern. A DCT matrix can be calculated for each of the color parameters in each of the color spaces (e.g., R, G, B, U, S, V, Y, Cb, Cr, etc.). The DCT is just one example way to extract the AC components. Other methods such as, for example, Discrete Sine Transform, Fourier Transform, Discrete Fourier Transform, Integer transform (used in H.264), Hadamard transform, Walsh transform, Haar transform, wavelet transform, slant transform, KL (Karhunen Loeve) transform, can be used to calculate the DC and AC parameters for the color parameters of any of the color spaces. Any of these transforms can provide spatial frequency characteristics of an image.

At sub-stage 120, the processing unit 26 compares the saturation indication of the desired object to a plurality of candidate saturation indications associated with a plurality of stored candidate images. The saturation indications of the stored candidate images can be determined by any of the DVRs 20 or 21, the video sources 12, 14 or 16, the processing unit 26, the camera 40 or the encoder 42. The candidate saturation indications can be stored as metadata in association with the stored candidate images. Alternatively to determining the saturation indications in advance and storing them as metadata, the processing unit 26 can determine the saturation indications in real-time using the HSV transformation relationships (4A-4E) to obtain the saturation indication. When the input representation data is a block of pixels, the input image can be down-sampled to an eight-by-eight block of pixels, and the block of down-sampled pixels can be converted to HSV using the relationships (4A-4E). The DC values of the eight-by-eight block of pixels can be computed from the average values of all the down-sampled 8×8 pixel blocks for any of the color space parameters using the following relationship:

$$DC(I) = \dfrac{\sum_{i=0}^{7} \sum_{j=0}^{7} I_{ij}}{64} \quad (5)$$

where I is an eight-by-eight pixel block. DC values from the RGB space can be calculated with equation (5. The DC values of the RGB space can be used to derive the DC values for other color spaces using known relationships.

At decision block 125, if the candidate saturation indication associated with a presently compared one of the stored candidate images is not in a prescribed range of saturation indications, the prescribed threshold range of saturation indications including the saturation indication of the desired object, the processing unit 26 discards the presently compared candidate image as a possible match to the desired object at sub-stage 130. Otherwise, the process 100 proceeds to sub-stage 135 where, if more candidate images remain to be compared, the process 100 repeats sub-stages 115, 120, 125, 130 and 135. If no more candidate images remain, the process proceeds to stage 140.

The prescribed threshold range of saturation indications can be determined through experimentation, or can be tuned by a user of one of the end user devices 24 while the search is being performed. The prescribed threshold range can be defined by a single threshold value or by a pair of threshold values. For example, the saturation threshold can be set to 0.1 (0<S<1.0). When searching for objects with a DC value of saturation less than the threshold 0.1, only candidate images with saturation less than 0.1 are considered. When searching for objects with a DC value of saturation greater than 0.1, only candidate images with a saturation indication greater than 0.1 are considered.

Upon completing the saturation filtering stage 112, the process 100 continues at stage 140, where the processing unit 26 determines which of the non-discarded candidate images are the best possible matches to the desired object based on comparisons of the input representation data in the first color space and/or the second color space(s) and the corresponding color parameters of the stored candidate images. The determination of the possibly matching candidate images can include calculation of a Euclidean distance between a query feature vector Q of the input representation and a corresponding feature vector F of each of the stored candidate images. For example, in the process 100, a feature vector used for color matching is F={R,G,B,H,V}. This feature vector includes the DC components of the relative RGB parameters and the DC components of the hue (H) and value (V) parameters of the HSV color space. The color comparison distance D is calculated using the following relationship:

$$D = \sum_{m=0}^{K-1} w_m \|F_m - Q_m\| \quad (6)$$

where $\|.\|$ is the Euclidean distance between the candidate image feature vector F and the query feature vector Q of the input representation data. The number of parameters in the feature vectors is K. The parameter $w_m$ is a weight to adjust the importance of the different feature components. The weights $w_m$ can be selected by the user of one of the end-user devices 24. Alternatively, the weights $w_m$ can be selected to normalize the parameters in the features vectors to be in the same scale.

Upon calculating the color comparison distance D for each of the non-discarded candidate images, the processing unit 26 can determine the best possible matches based on the color comparison distances D, where a smaller value of D represents a better possibility of a match. The processing unit 26 can cause the display of one of the end-user devices to display the corresponding candidate images in ascending order of D. The user looks through thumbnail images of the possible matching candidate images that are identified as likely matches looking for a match. Once a match is found, the system can use the matched image as an example image for a search by example using the process 100 again, as opposed to search by description features generated by the user.

Figure 6:
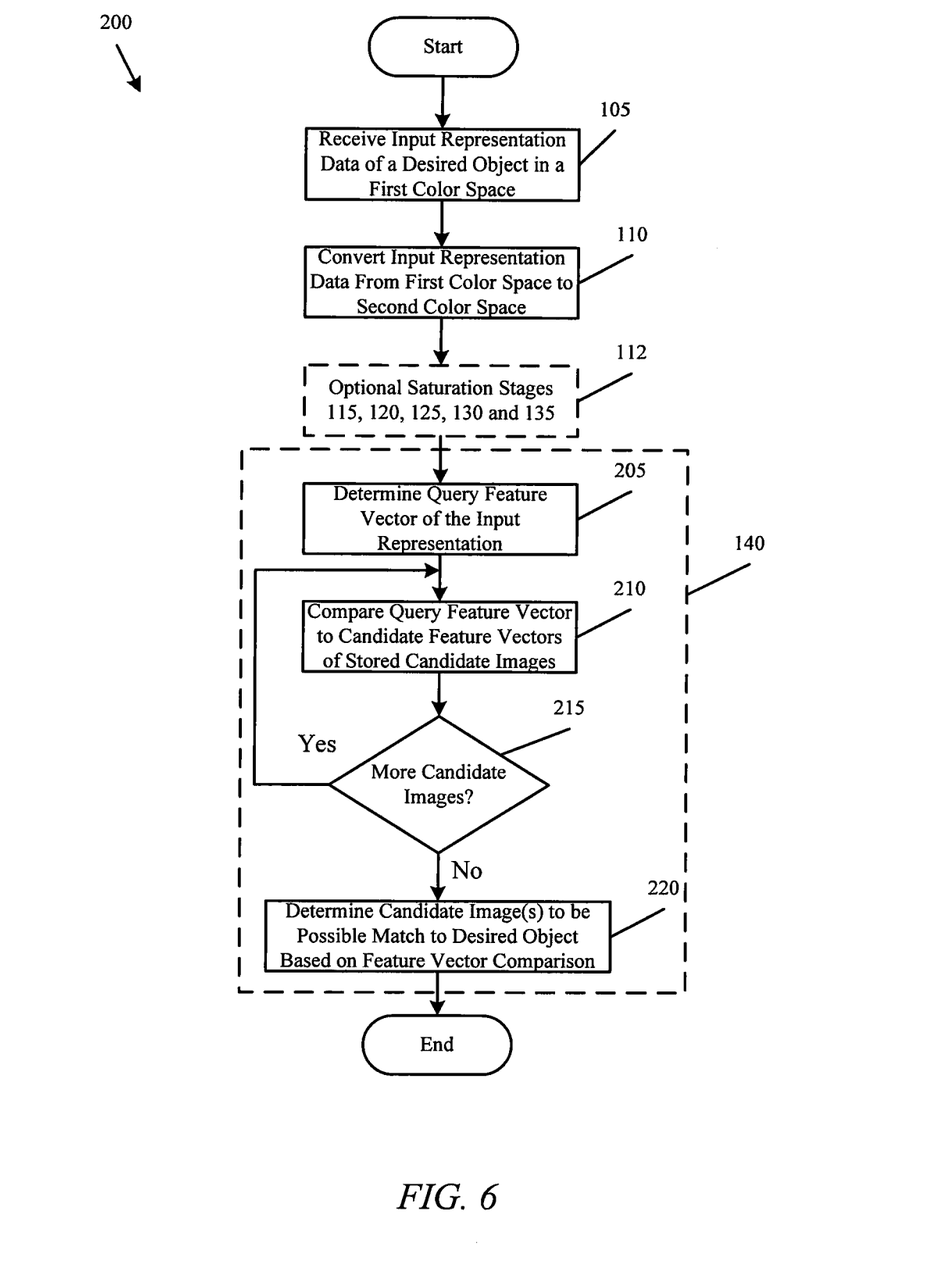
FIG. 6 is another process for sorting electronic color images of objects in accordance with the disclosure.

Referring to FIG. 6, with further reference to FIGS. 1-3, another process 200 of sorting electronic color images for objects matching a desired object includes the stages shown. The process 200 is, however, an example only and not limiting. The process 200 can be altered, e.g., by having stages added, removed, rearranged, combined, and/or performed concurrently.

Process 200 includes some of the same stages as the process 100. Specifically, stages 105, 110 and 112, where stage 112 includes the sub-stages 105, 110, 115, 120, 125 and 130, are unchanged from the process 100. However, the saturation filter stages 112, including all the sub-stages 105, 110, 115, 120, 125 and 130, are optional and can be omitted from the process 200.

The process 200 includes a more detailed stage 140 than the process 100. Upon completing stage 110 and possibly optional stage 112, the process 200 proceeds to stage 205, where the processing unit 26 determines a query feature vector Q including a plurality of parameters associated with color of the input representation, the query feature vector parameters including at least a first parameter of the first color space of the input representation and at least a first parameter of at least one second color space (e.g., the HSV and YCbCr color spaces). The process 200 uses an extended feature vector F' that includes the feature vector F of the process 100 and one or more of the AC components of the DCT matrices (or other transforms as discussed above) of color parameters in the YCbCr color space. In this example process 200, the extended feature vector is F'={F,{$Y_i$}$_{i=[1,N]}$,{$Cb_j,Cr_j$}$_{j=[1,M]}$}, where N is the number of AC components of object intensity Y and M is the number of AC components of the object color parameters Cb and Cr. The numbers N and M can be determined by experimentation, or can be chosen by the user of an end-user device 24. Default values of N=5 and M=2 have been found to be appropriate for some searches, but other values of N and M can be used.

By extending the feature vector to include some of the AC components of the Y, Cb and Cr parameters, the search can match the color distribution of the desired object. The downsized pixel blocks that are used to provide the color layout parameters via the DCT operation, can include a fixed block size, such as, for example an eight-by-eight pixel block. Other block sizes can also be used (e.g., 4-by-4, 16-by-16, 32-by-32 and others). For image blocks smaller that eight-by-eight pixels, interpolation of pixels (e.g., bilinear interpolation) can be used to up-sample an image to an eight-by-eight pixel block. Downsized pixel blocks can be calculated by any of the DVRs 20 or 21, the video sources 12, 14 or 16, the camera 40, the encoder 42 or the processing unit 26 using a scene analyzer. The scene analyzer identifies objects using background subtraction. The scene analyzer draws a bounding box around the detected objects. The bounding box pixels are resized to an eight-by-eight pixel block. The pixels of the identified object can be average to arrive at the RGB values of the down-sampled pixels. For example, a 120-by-80 pixel bounding block is broken into sixty-four 15×10 pixel blocks and the pixel values of all the pixels in the 15×10 pixel blocks are averaged to form one pixel of the 8×8 pixel block.

At stage 210, the processing unit compares the query feature vector Q to a candidate feature vector F', each candidate feature vector including a plurality of parameters associated with color of a respective one of a plurality of stored candidate images. The comparison can comprise a color distance calculation. The color distance D between a candidate feature vector F' and the query feature vector Q of the input representation data is calculated by the following equation:

$$D = \sum_{m=0}^{K-1} w_m \|F'_m - Q_m\| \quad (7)$$

Where K is the number of parameters in the feature vectors F' and Q and $w_m$ is a weighting factor. The DC components such as R, G, B, H and V can be given higher weights than the AC components of Y, Cb and Cr. For example, DC components can be given a weight of 4, AC(1) and AC(2) components can be given a weight of 2, and AC(3), AC(4) and AC(5) components can be given a weight of 1.

At stage 215, the processing unit 26 determines if more candidate images are available. If more candidate images remain, the process returns to stage 210. If no more candidate images remain, the process 200 continues to stage 220. At stage 220, the processing unit 26 determines which of the candidate images are possible matches based on the comparison of feature vectors provided by the color distance calculation performed at stage 210 using equation (7). The lower the color distance D, the more likely the corresponding candidate image is a match. The candidate images can be sorted in ascending order of the color distance D. The process 200 can be repeated with the user changing the values of the weights $w_m$ and/or changing the input representation data (e.g., by using a selected best matching image as a sample image to be used as the input representation data in another search).

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some configurations (including implementations) may employ a computer system (such as the server 23) to perform methods in accordance with various configurations of the invention. According to a set of configurations, some or all of the procedures of such methods are performed by the server 23 in response to CPU/DSP 27 executing one or more sequences of one or more instructions (which might be incorporated into an operating system and/or other code, such as an application program) contained in the memory 28. Such instructions may be read into the memory 28 from another computer-readable medium, such as one or more of the storage 32. Merely by way of example, execution of the sequences of instructions contained in the memory 28 might cause the CPU/DSP 27 to perform one or more procedures of the methods described herein.

The terms "machine-readable medium" and "computer-readable medium," as used herein, refer to any medium that participates in providing data that causes a machine to operate in a specific fashion. In an embodiment implemented using the server 23, various computer-readable media might be involved in providing instructions/code to processing unit 26 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage 32. Volatile media include, without limitation, dynamic memory, such as the memory 28. Transmission media include, without limitation, coaxial cables, copper wire and fiber optics. Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the CPU/DSP 27 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the server 23. These signals, which might be in the form of electromagnetic signals, acoustic signals, optical signals and/or the like, are all examples of carrier waves on which instructions can be encoded, in accordance with various configurations of the invention.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, the preceding description details security camera system. However, the systems and methods described herein may be applicable to other forms of camera systems.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Further, more than one invention may be disclosed.

What is claimed is:

1. A method of sorting electronic color images of objects, the method comprising:
receiving, at a server from an end-user device, an input representation of a desired object to be located in the color images, the input representation including first data representing a first color of the desired object, the first data being in a first color space;
determining an indication of saturation of the first color;
defining a prescribed range of saturation indications based on the determined indication of saturation of the first color;
comparing the prescribed range of saturation indications to a plurality of candidate saturation indications associated with a plurality of stored candidate images; and
in response to the candidate saturation indication associated with a presently compared one of the stored candidate images not being in the prescribed range of saturation indications, the prescribed range of saturation indications including the indication of saturation of the first color, discarding the presently compared candidate image as possibly including the desired object; or
in response to the candidate saturation indication associated with the presently compared one of the stored candidate images being in the prescribed range of saturation indications, determining that the candidate image possibly includes the desired object.

2. The method of claim 1 further comprising:
converting the first data in the first color space into second data in a second color space different than the first color space, wherein at least one of the first color space or the second color space includes a saturation parameter;
determining a query feature vector including a plurality of parameters associated with color of the input representation, the query feature vector parameters including at least a first parameter from the first color space and at least a first parameter from the second color space;
making a feature vector comparison by comparing the query feature vector to a plurality of candidate feature vectors associated with at least a portion of the stored candidate images, each candidate feature vector including a plurality of parameters associated with color of a respective one of the stored candidate images, the candidate feature vector parameters including at least the first parameter from the first color space and at least the first parameter from the second color space; and
in response to the feature vector comparison, determining that the candidate image possibly includes the desired object.

3. The method of claim 2 wherein the input representation is an image representation comprising a plurality of pixels.

4. The method of claim 3 further comprising:
down-sampling the input representation to a block of down-sampled pixels; and
determining a plurality of spatial frequency values of the block of down-sampled pixels in at least one of the first color space or the second color space,
wherein the query feature vector further includes at least one of the spatial frequency values of the input representation image and each of the candidate feature vectors includes at least one spatial frequency value of the respective candidate image.

5. The method of claim 4 wherein the first color space is relative RGB color space, the second color space is HSV, and the spatial frequency values are in YCbCr color space.

6. The method of claim 1 further comprising discarding the presently compared candidate image in response to a value of the indication of saturation of the first color being greater than a threshold value and the candidate saturation indication of the presently compared candidate image being less than the threshold value.

7. The method of claim 1 wherein a user interface allows the user to choose one or more colors for the input representation of the desired object from a color palette.

8. The method of claim 1 wherein the first color corresponds to a first region of the desired object, the method further comprising receiving, at the server from the end-user device, an input representation of a second color of a second region of the desired object, the second region being distinct from the first region.

9. A system for sorting electronic color images of objects, the system comprising:
a communication interface configured to receive, at a server from an end-user device, an input representation of a desired object, the input representation including first data representing a first color of the desired object, the first data being in a first color space; and
a processing unit communicatively coupled to the communication interface and configured to:
determine an indication of saturation of the first color of the received input representation;
define a prescribed range of saturation indications based on the determined indication of the saturation of the first color;
compare the prescribed range of saturation indications to a plurality of candidate saturation indications associated with a plurality of candidate images stored in a memory of the processing unit;
in response to the candidate saturation indication associated with a presently compared one of the stored candidate images not being in the prescribed range of saturation indications, discard the presently compared candidate image as possibly including the desired object; and
in response to the candidate saturation indication of the presently compared one of the stored candidate images being in the prescribed range of saturation indications, determine that the candidate image possibly includes the desired object.

10. The system of claim 9 wherein the processing unit is configured to convert first data in the first color space into second data in a second color space different than the first color space, wherein at least one of the first color space or the second color space includes a saturation parameter; and wherein the first color space or the second color space is relative RGB color space.

11. The system of claim 9 wherein the processing unit is further configured to:
  determine a query feature vector including a plurality of parameters associated with color of the input representation, the query feature vector parameters including at least a first parameter from the first color space and at least a first parameter from the second color space;
  make a feature vector comparison by comparing the query feature vector to a plurality of candidate feature vectors associated with at least a portion of the stored candidate images, each candidate feature vector including a plurality of candidate feature vector parameters associated with color of a respective one of the stored candidate images, the candidate feature vector parameters including at least the first parameter from the first color space and at least the first parameter from the second color space; and
  in response to the feature vector comparison, determine that the candidate image possibly includes the desired object.

12. The system of claim 11 wherein the input representation is an image representation comprising a plurality of pixels.

13. The system of claim 12 wherein the processing unit is further configured to:
  down-sample the input representation to a block of down-sampled pixels; and
  determine a plurality of spatial frequency values of the block of down-sampled pixels in at least one of the first color space or the second color space,
  wherein the query feature vector further includes at least one of the spatial frequency values of the input representation image and each of the candidate feature vectors includes at least one spatial frequency value of the respective candidate image.

14. The system of claim 13 wherein the first color space is relative RGB color space, the second color space is HSV, and the spatial frequency values are in YCbCr color space.

15. The system of claim 9 wherein the processing unit is further configured to discard the presently compared candidate image if a value of the saturation indication of the first color is greater than a threshold value and the candidate saturation indication of the presently compared candidate image is less than the threshold value.

16. The system of claim 9 further comprising the end-user device, the end-user device including a user interface configured to allow the user to choose one or more colors for the input representation of a desired object by selecting one or more colors from a color palette.

17. A non-transitory machine-readable storage medium comprising instructions embodied thereon that, when executed by at least one machine, cause the at least one machine to:
  receive at a server from an end-user device, an input representation of a desired object, the input representation including first data representing a first color of the desired object, the first data being in a first color space;
  determine an indication of saturation of the first color;
  define a prescribed range of saturation indications based on the determined indication of saturation of the first color;
  compare the prescribed range of saturation indications to a plurality of candidate saturation indications associated with a plurality of stored candidate images;
  in response to the candidate saturation indication associated with a presently compared one of the stored candidate images not being in the prescribed range of saturation indications, discard the presently compared candidate image as possibly including the desired object; and
  in response to the candidate saturation indication associated with a presently compared one of the stored candidate images being in the prescribed range of saturation indications, determine that the candidate image possibly includes the desired object.

18. The non-transitory machine-readable storage medium recited in claim 17 wherein the instructions further comprise instructions that cause the at least one machine to:
  convert the first data representing at least one color of a desired object from the first color space into second data in a second color space different than the first color space, wherein at least one of the first color space or the second color space includes a saturation parameter;
  determine a query feature vector including a plurality of parameters associated with color of the desired object, the query feature vector parameters including at least a first parameter from the first color space and at least a first parameter from the second color space;
  make a feature vector comparison of the query feature vector to a plurality of candidate feature vectors associated with at least a portion of the stored candidate images, each candidate feature vector including a plurality of parameters associated with color of a respective one of the stored candidate images, the candidate feature vector parameters including at least the first parameter from the first color space and at least the first parameter from the second color space; and
  determine based on the feature vector comparison, that the candidate image possibly includes the desired object.

19. The non-transitory machine-readable storage medium recited in claim 18 wherein the first data is an image representation comprising a plurality of pixels.

20. The non-transitory machine-readable storage medium recited in claim 19 wherein the instructions further comprise instructions that cause the at least one machine to:
  down-sample the pixels of the image to a block of down-sampled pixels; and
  determine a plurality of spatial frequency values of the block of down-sampled pixels in at least one of the first color space or the second color space,
  wherein the query feature vector further includes at least one of the spatial frequency values of the input representation image and each of the candidate feature vectors includes at least one spatial frequency value of the respective candidate image.

* * * * *